United States Patent
Yamakawa et al.

(10) Patent No.: US 7,403,841 B2
(45) Date of Patent: Jul. 22, 2008

(54) CONTROL SYSTEM AND METHOD FOR CONTROLLING A MOVING BODY

(75) Inventors: Takesi Yamakawa, Iizuka (JP); Hitoshi Maeno, Nishinomiya (JP); Eiji Uchino, Iizuka (JP); Hirohiko Morita, Iizuka (JP)

(73) Assignee: Furuno Electric Company, Limited., Nishinomiya (JP)

( * ) Notice: Subject to any disclaimer, the term of this patent is extended or adjusted under 35 U.S.C. 154(b) by 537 days.

(21) Appl. No.: 10/809,399

(22) Filed: Mar. 26, 2004

(65) Prior Publication Data

US 2004/0193332 A1     Sep. 30, 2004

(30) Foreign Application Priority Data

Mar. 31, 2003   (JP) ............................. 2003-097319

(51) Int. Cl.
*G05D 1/00* (2006.01)

(52) U.S. Cl. ............................................. 701/1; 700/21

(58) Field of Classification Search ................. 701/25, 701/37, 39, 45, 46, 1; 702/182–185; 700/21, 700/79, 80; 714/25, 37, 39, 45, 46
See application file for complete search history.

(56) References Cited

U.S. PATENT DOCUMENTS

| | | | | |
|---|---|---|---|---|
| 3,517,285 A | * | 6/1970 | Kundler | 318/588 |
| 3,604,907 A | * | 9/1971 | Wesner | 701/116 |
| 3,656,043 A | * | 4/1972 | Kawada et al. | 318/588 |
| 3,696,282 A | * | 10/1972 | Hirokawa et al. | 318/588 |
| 4,625,697 A | * | 12/1986 | Hosaka | 123/478 |
| 5,014,206 A | * | 5/1991 | Scribner et al. | 701/207 |
| 7,039,507 B2 | * | 5/2006 | Hagenbuch | 701/29 |

FOREIGN PATENT DOCUMENTS

| | | |
|---|---|---|
| JP | 1153664 | 6/1989 |
| JP | 10175597 | 6/1998 |
| JP | 2001138273 | 5/2001 |
| JP | 2002298150 | 10/2002 |

* cited by examiner

*Primary Examiner*—Dalena Tran
(74) *Attorney, Agent, or Firm*—Birch, Stewart, Kolasch & Birch, LLP

(57) ABSTRACT

An automatic steering control system comprises a behavior detector, a pattern matching section and a control parameter setter. The behavior detector sequentially determines a time duration of each of specific kinds of behaviors of a ship based on heading data detected by a heading sensor. The pattern matching section sequentially determines a behavior pattern which each of the behaviors of the ship matches from among multiple behavior patterns based on the heading data detected by the heading sensor during the time duration of each of the behaviors sequentially determined by the behavior detector. The control parameter setter sequentially reads out control parameters stored in a memory in correlation with the behavior pattern which each of the behaviors of the ship matches as determined by the pattern matching section and controls the ship based on the control parameters read out of the memory.

4 Claims, 9 Drawing Sheets

22: Steeringt Amount Calculator

Fig. 8

| ωc \ θc | NL | NS | ZR | PS | PL |
|---|---|---|---|---|---|
| NL | $P_{11}$ | $P_{12}$ | $P_{13}$ | $P_{14}$ | $P_{15}$ |
| NS | $P_{21}$ | $P_{22}$ | $P_{23}$ | $P_{24}$ | $P_{25}$ |
| ZR | $P_{31}$ | $P_{32}$ | $P_{33}$ | $P_{34}$ | $P_{35}$ |
| PS | $P_{41}$ | $P_{42}$ | $P_{43}$ | $P_{44}$ | $P_{45}$ |
| PL | $P_{51}$ | $P_{52}$ | $P_{53}$ | $P_{54}$ | $P_{55}$ |

ZR
PS
PL

CONTROL SYSTEM AND METHOD FOR CONTROLLING A MOVING BODY

BACKGROUND OF THE INVENTION

The present invention relates to a control system and a control method and, in particular, to a control system and a control method for properly controlling a subject to be controlled which repetitively performs one of multiple behavior patterns.

In generally used conventional real-time control technology, a control quantity at a particular point in time is assessed based on a deviation of a current value of the control quantity from a target value and an amount of operation to be used at a subsequent point in time is determined based on this deviation. If there exist disturbances of which frequency band overlaps the frequency band of a control quantity output signal, or the frequency band of the control quantity output signal is uncertain (unknown or variable with time), and the disturbances which are difficult to remove by conventionally available ordinary filtering techniques are superimposed on the control quantity, there arises a problem that it is difficult to properly assess the control quantity and, as a consequence, it is difficult to properly control a subject to be controlled.

SUMMARY OF THE INVENTION

In light of the foregoing, it is an object of the present invention to provide a control system and a control method which make it possible to properly control a subject to be controlled which repetitively performs multiple behavior patterns by eliminating the influence of disturbances which are difficult to remove by conventionally available ordinary filtering techniques.

A control system for controlling a control quantity of a subject to be controlled according to the present invention comprises a control quantity acquisition section, a timing judgment section, a behavior pattern judgment section, a control parameter storage section, a control parameter read-out section and a control section. The control quantity acquisition section sequentially acquires instantaneous values of the control quantity. The timing judgment section sequentially determines a time duration of each of specific kinds of behaviors of the controlled subject based on the values of the control quantity acquired by the control quantity acquisition section. The behavior pattern judgment section sequentially determines a behavior pattern which each of the behaviors of the controlled subject matches from among multiple behavior patterns based on the values of the control quantity acquired by the control quantity acquisition section during the time duration of each of the behaviors sequentially determined by the timing judgment section. The control parameter storage section stores control parameters in correlation with each of the multiple behavior patterns. The control parameter read-out section sequentially reads out the control parameters stored in the control parameter storage section in correlation with the behavior pattern which each of the behaviors of the controlled subject matches as determined by the behavior pattern judgment section. The control section controls the controlled subject based on the control parameters sequentially read out by the control parameter read-out section.

A control method for controlling a control quantity of a subject to be controlled according to the present invention comprises a control quantity acquisition step, a timing judgment step, a behavior pattern judgment step, a control parameter read-out step and a control step. The control quantity acquisition step is to sequentially acquire instantaneous values of the control quantity. The timing judgment step is to sequentially determine a time duration of each of specific kinds of behaviors of the controlled subject based on the values of the control quantity acquired in the control quantity acquisition step. The behavior pattern judgment step is to sequentially determine a behavior pattern which each of the behaviors of the controlled subject matches from among multiple behavior patterns based on the values of the control quantity acquired in the control quantity acquisition step during the time duration of each of the behaviors sequentially determined in the timing judgment step. The control parameter read-out step is to sequentially read out control parameters stored in correlation with the behavior pattern which each of the behaviors of the controlled subject matches as determined in the behavior pattern judgment step from a control parameter storage section storing the control parameters in correlation with each of the multiple behavior patterns. The control step is to control the controlled subject based on the control parameters sequentially read out in the control parameter read-out step.

With the control system and method according to the present invention, the instantaneous values of the control quantity are sequentially acquired and the time duration of each of the specific kinds of behaviors of the controlled subject is sequentially determined based on the values of the control quantity. The controlled subject may be a motor vehicle including a two-wheeled vehicle, an aircraft, a robot, a building, or else, and the control quantity may be a position, posture, temperature, density, or else. The time duration of each of the specific kinds of behaviors is a time duration from a point in time at which the control quantity takes a maximal value to a point in time at which the control quantity takes a maximal value next. Alternatively, the time duration of each of the specific kinds of behaviors may be a time duration from a point in time at which the control quantity takes a minimal value to a point in time at which the control quantity takes a minimal value next. Also, the time duration of each of the specific kinds of behaviors may be a time duration from a point in time at which the control quantity takes a minimal value to a point in time at which the control quantity takes a maximal value next. Also, the time duration of each of the specific kinds of behaviors may be a time duration from a point of inflection of the control quantity to a next point of inflection thereof. Still alternatively, the time duration of each of the specific kinds of behaviors may be a time duration from a point in time at which the value of the control quantity matches a target value to a point in time at which the value of the control quantity matches the target value next. Whichever is the case, the time duration of each of the specific kinds of behaviors is sequentially determined based on the sequentially acquired values of the control quantity.

Based on the value of the control quantity acquired during the time duration of each of the behaviors of the controlled subject, a behavior pattern which each of the behaviors performed during the time duration matches is determined from among multiple behavior patterns. Then, the controlled subject is controlled in accordance with the control parameters stored in correlation with the behavior pattern determined. The behavior of the controlled subject is sequentially judged in the aforementioned fashion and efficiently controlled based on the result of judgment according to the present invention.

In one aspect of the invention, the control system further includes a behavior evaluation value calculating section for sequentially calculating an evaluation value of the behavior performed by the controlled subject based on the values of the control quantity acquired by the control quantity acquisition section during the time duration of each of the behaviors sequentially determined by the timing judgment section, and a control parameter update section for updating the control parameters stored in the control parameter storage section based on the evaluation value sequentially calculated by the behavior evaluation value calculating section. This makes it possible to perform adaptive control operation of the controlled subject. For example, the evaluation value may be a value representing the magnitude of each behavior of the controlled subject, such as a change in the control quantity during the time duration of each behavior.

The control parameter update section of the control system thus constructed may update the control parameters used during the time duration of each behavior corresponding to the evaluation value sequentially calculated by the behavior evaluation value calculating section.

In another aspect of the invention, the timing judgment section determines timings at which the control quantity acquired by the control quantity acquisition section takes extrema as being a start timing and an end timing of the time duration of each of the behaviors based on the values of the control quantity acquired by the control quantity acquisition section. This approach makes it possible to determine the time duration of each of the specific kinds of behaviors relatively easily.

In still another aspect of the invention, the controlled subject is a ship, the control quantity is the ship's heading, and the control section controls a steering device of the ship. In this specific form of application of the invention, the direction of motion of the ship can be properly controlled.

Another control system for controlling a control quantity of a subject to be controlled according to the present invention comprises a control quantity acquisition section, a timing judgment section, a behavior pattern judgment section, a control parameter acquisition section and a control section. The control quantity acquisition section sequentially acquires instantaneous values of the control quantity. The timing judgment section sequentially determines a time duration of each of specific kinds of behaviors of the controlled subject based on the values of the control quantity acquired by the control quantity acquisition section. The behavior pattern judgment section sequentially determines a behavior pattern which each of the behaviors of the controlled subject matches from among multiple behavior patterns based on the values of the control quantity acquired by the control quantity acquisition section during the time duration of each of the behaviors sequentially determined by the timing judgment section. The control parameter acquisition section sequentially acquires control parameters corresponding to the behavior pattern which each of the behaviors of the controlled subject matches as determined by the behavior pattern judgment section. The control section controls the controlled subject based on the control parameters sequentially acquired by the control parameter read-out section.

Another control method for controlling a control quantity of a subject to be controlled according to the present invention comprises a control quantity acquisition step, a timing judgment step, a behavior pattern judgment step, a control parameter acquisition step and a control step. The control quantity acquisition step is to sequentially acquire instantaneous values of the control quantity. The timing judgment step is to sequentially determine a time duration of each of specific kinds of behaviors of the controlled subject based on the values of the control quantity acquired in the control quantity acquisition step. The behavior pattern judgment step is to sequentially determine a behavior pattern which each of the behaviors of the controlled subject matches from among multiple behavior patterns based on the values of the control quantity acquired in the control quantity acquisition step during the time duration of each of the behaviors sequentially determined in the timing judgment step. The control parameter acquisition step is to sequentially acquire control parameters corresponding to the behavior pattern which each of the behaviors of the controlled subject matches as determined in the behavior pattern judgment step. The control step is to control the controlled subject based on the control parameters sequentially acquired in the control parameter read-out step.

With the control systems and methods according to the invention, the behavior of the controlled subject is sequentially judged and efficiently controlled based on the result of judgment. The control parameter acquisition section and the control parameter acquisition step may acquire the control parameters by using fuzzy inference, a neural network, a radial basis function (RBF) network or a wavelet network.

With the present invention, time durations of the specific kinds of behaviors of the controlled subject are sequentially judged and the behavior pattern which each of the behaviors of the controlled subject matches is determined from among the multiple behavior patterns based on the control parameters acquired during each of the time durations. Then, the control parameters stored in the control parameter storage section in correlation with the behavior pattern which each of the behaviors of the controlled subject matches is sequentially read out and the subject is controlled according to the control parameters. The behavior of the controlled subject is sequentially judged in this fashion and the subject is controlled in an efficient manner based on the result of judgment.

Other features and advantages of the invention will be more readily understood from the following detailed description of specific embodiments thereof when read in conjunction with accompanying drawings.

BRIEF DESCRIPTION OF THE DRAWINGS

FIG. 8 is a diagram showing an example of a fuzzy rule table group;

DETAILED DESCRIPTION OF THE PREFERRED EMBODIMENT OF THE INVENTION

The present invention is now described in detail, by way of example, with reference to a preferred embodiment thereof illustrated in the accompanying drawings.

Figure 1:
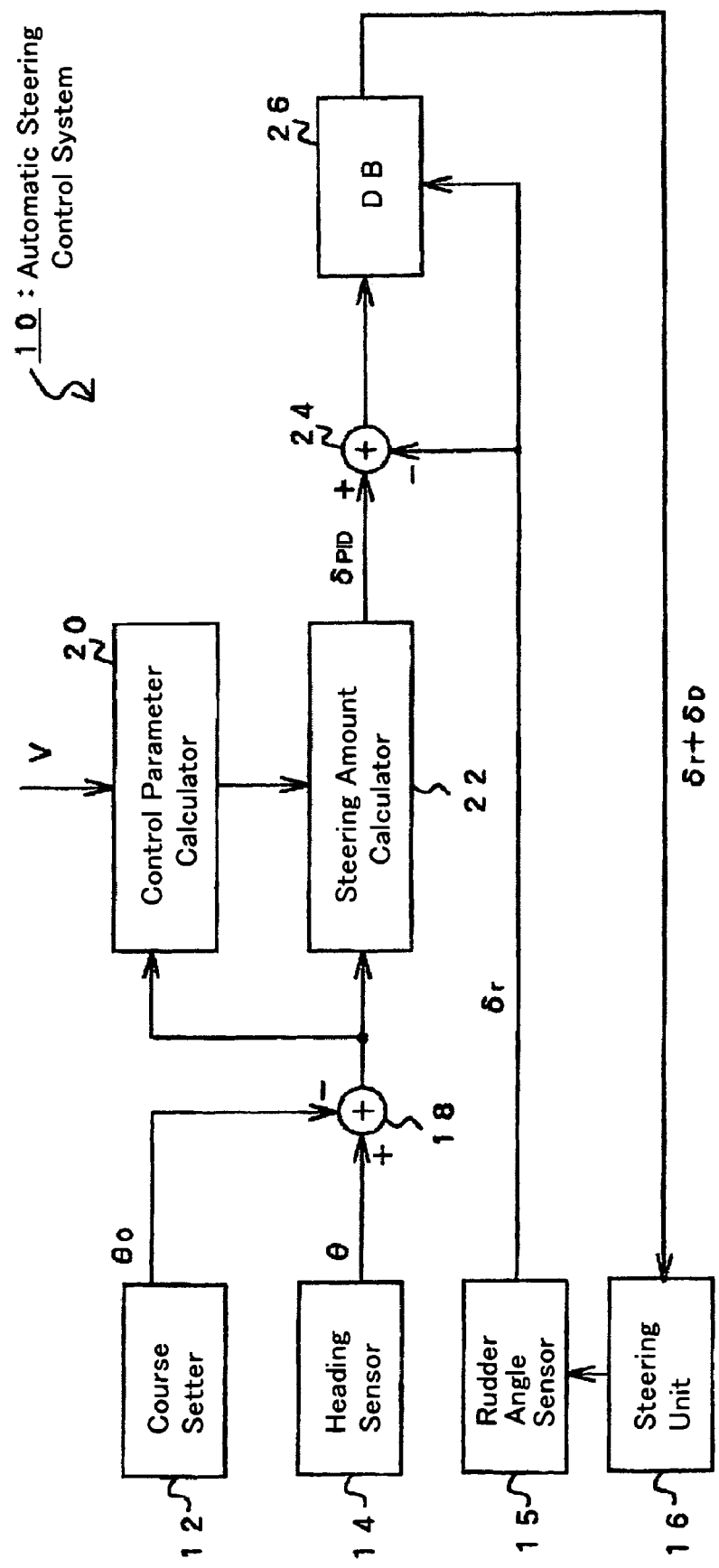
FIG. 1 is a block diagram showing the configuration of an automatic steering control system according to a preferred embodiment of the invention.

FIG. 1 is a block diagram showing the configuration of an automatic steering control system 10 according to the preferred embodiment of the invention. Installed on a ship being a subject to be controlled, the automatic steering control system 10 includes a course setter 12, a heading sensor 14, a rudder angle sensor 15, a steering unit 16, adders 18, 24, a control parameter calculator 20, a steering amount calculator 22 and a deadband processor 26 as shown in FIG. 1. The automatic steering control system 10 controls the heading of the ship by automatically operating the steering unit 16.

The course setter 12 outputs information on an intended course $\theta_0$ of the ship as a target value. The intended course $\theta_0$ may be manually set by a course setting knob or given through mathematical operation by conventional navigation equipment onboard including a satellite positioning system, for example. The intended course $\theta_0$ is the intended direction of motion of the ship expressed in degrees as 0° to 360° measured clockwise with respect to the true north. The output $\theta_0$ of the course setter 12 delivered to the adder 18 is assigned a negative sign.

The heading sensor 14 outputs information on a current heading $\theta$ of the ship as a control quantity. The heading $\theta$ of the ship expressed also in degrees as 0° to 360° measured clockwise with respect to the true north is delivered to the adder 18 and the control parameter calculator 20. The heading $\theta$ may be output through a low-pass filter provided in the heading sensor 14, for example, or an output of the adder 18 may be passed through a low-pass filter.

The steering unit 16 is conventional onboard equipment including a rudder driver for driving a rudder of the ship by means of a hydraulic pump and a cylinder, for example, and a rudder controller for matching true rudder angle with a demanded rudder angle. The rudder angle sensor 15 connected to the steering unit 16 outputs a current rudder angle, that is, the true rudder angle $\delta r$, which is fed into the adder 24 and the deadband processor 26. As the demanded rudder angle ($\delta r + \delta D$) is entered from the deadband processor 26 into the steering unit 16, the steering unit 16 varies the true rudder angle $\delta r$ so that the true rudder angle $\delta r$ matches the demanded rudder angle ($\delta r + \delta D$).

The adder 18 calculates a deviation of the current heading $\theta$ of the ship output from the heading sensor 14 from the intended course $\theta_0$ output from the course setter 12 and supplies this deviation to the steering amount calculator 22. The deviation ($\theta - \theta_0$) output from the adder 18 is normalized so that the value of the deviation lies within a range of 0°±180°.

Figure 2:
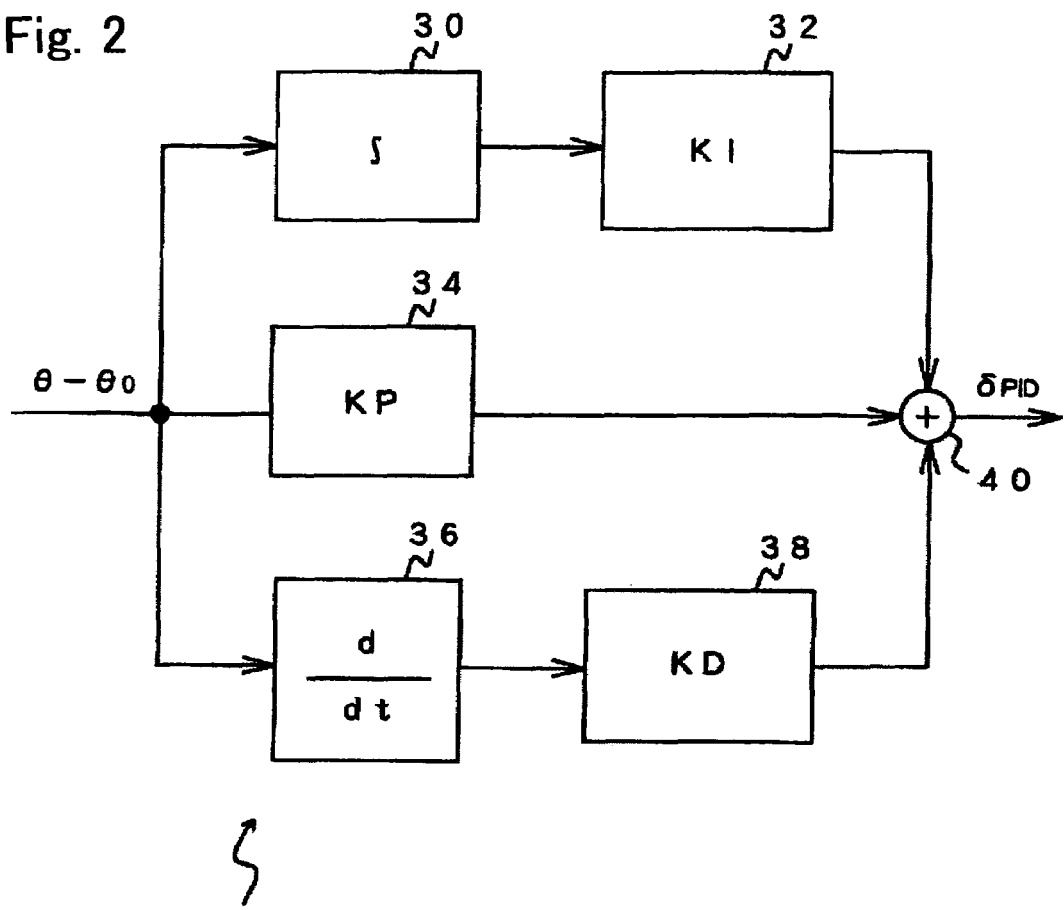
FIG. 2 is a block diagram showing the configuration of a steering amount calculator.

The steering amount calculator 22, to which the output of the adder 18 and an output of the control parameter calculator 20 are supplied, is conventionally known control means which performs proportional-plus-integral-plus-derivative (PID) control action. The steering amount calculator 22 calculates an amount of steering $\delta_{PID}$ from the deviation ($\theta - \theta_0$) normalized to the range of 0°±180° based on control parameters including a proportional coefficient KP, an integral coefficient KI and a differential coefficient KD. The steering amount calculator 22 may be configured by hardware alone or by a computer and a software program executed by the computer. Specifically, the steering amount calculator 22 of this embodiment includes an integrator 30, a differentiator 36, coefficient amplifiers 32, 34, 38 and an adder 40 as shown in FIG. 2. In the steering amount calculator 22 thus configured, the integrator 30 integrates the deviation ($\theta - \theta_0$) output from the adder 18 and the coefficient amplifier 32 multiplies the result of integration by the integral coefficient KI. At the same time, the coefficient amplifier 34 multiplies the deviation ($\theta - \theta_0$) by the proportional coefficient KP. Also, the differentiator 36 differentiates the deviation ($\theta - \theta_0$) and the coefficient amplifier 38 multiplies the result of differentiation by the differential coefficient KD. The results of these calculations are input into the adder 40, which outputs the sum of the input calculation results as the steering amount $\delta_{PID}$.

The steering amount $\delta_{PID}$ thus calculated is supplied to the adder 24. As the true rudder angle $\delta r$ assigned a negative sign output from the rudder angle sensor 15 is also supplied to the adder 24, the adder 24 calculates the difference between the steering amount $\delta_{PID}$ and the true rudder angle $\delta r$. The result of this calculation is supplied to the deadband processor 26.

Figure 3:
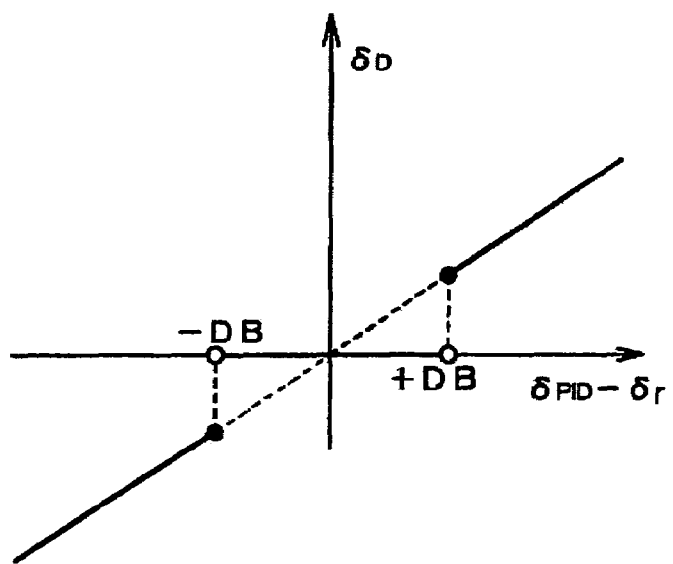
FIG. 3 is a diagram illustrating operation performed by a deadband processor.

When the absolute value of the difference between the steering amount $\delta_{PID}$ and the true rudder angle $\delta r$ input from the adder 24 is smaller than a specific value DB, the deadband processor 26 sets an internal value $\delta D$ to zero. When the absolute value of the difference between the steering amount $\delta_{PID}$ and the true rudder angle $\delta r$ input from the adder 24 is equal to or larger than the specific value DB, on the other hand, the deadband processor 26 uses the input difference value as the internal value $\delta D$ for further processing. The true rudder angle $\delta r$ from the rudder angle sensor 15 is also input into the deadband processor 26. The deadband processor 26 outputs the sum of the true rudder angle $\delta r$ and the internal value $\delta D$ to the steering unit 16. A dead band of the deadband processor 26 in which the demanded rudder angle ($\delta r + \delta D$) is not affected by the output of the steering amount calculator 22 (i.e., steering amount $\delta_{PID}$) is set in the aforementioned manner. The deadband processor 26 may also be configured by hardware alone or by a computer and a software program executed by the computer. There is a relationship shown in FIG. 3 between the input value ($\delta_{PID} - \delta r$) and the internal value $\delta D$ of the deadband processor 26.

The control parameter calculator 20 determines the control parameters (proportional coefficient KP, integral coefficient KI and differential coefficient KD) used by the steering amount calculator 22 for calculating the steering amount $\delta_{PID}$. The heading $\theta$ of the ship output from the heading sensor 14 and current ship speed V output from an unillustrated satellite positioning system or ship speed sensor are fed into the control parameter calculator 20. The control parameter calculator 20 determines the control parameters based on these input data. Again, the steering amount calculator 22 may be configured by hardware alone or by a computer and a software program executed by the computer.

Figure 4:
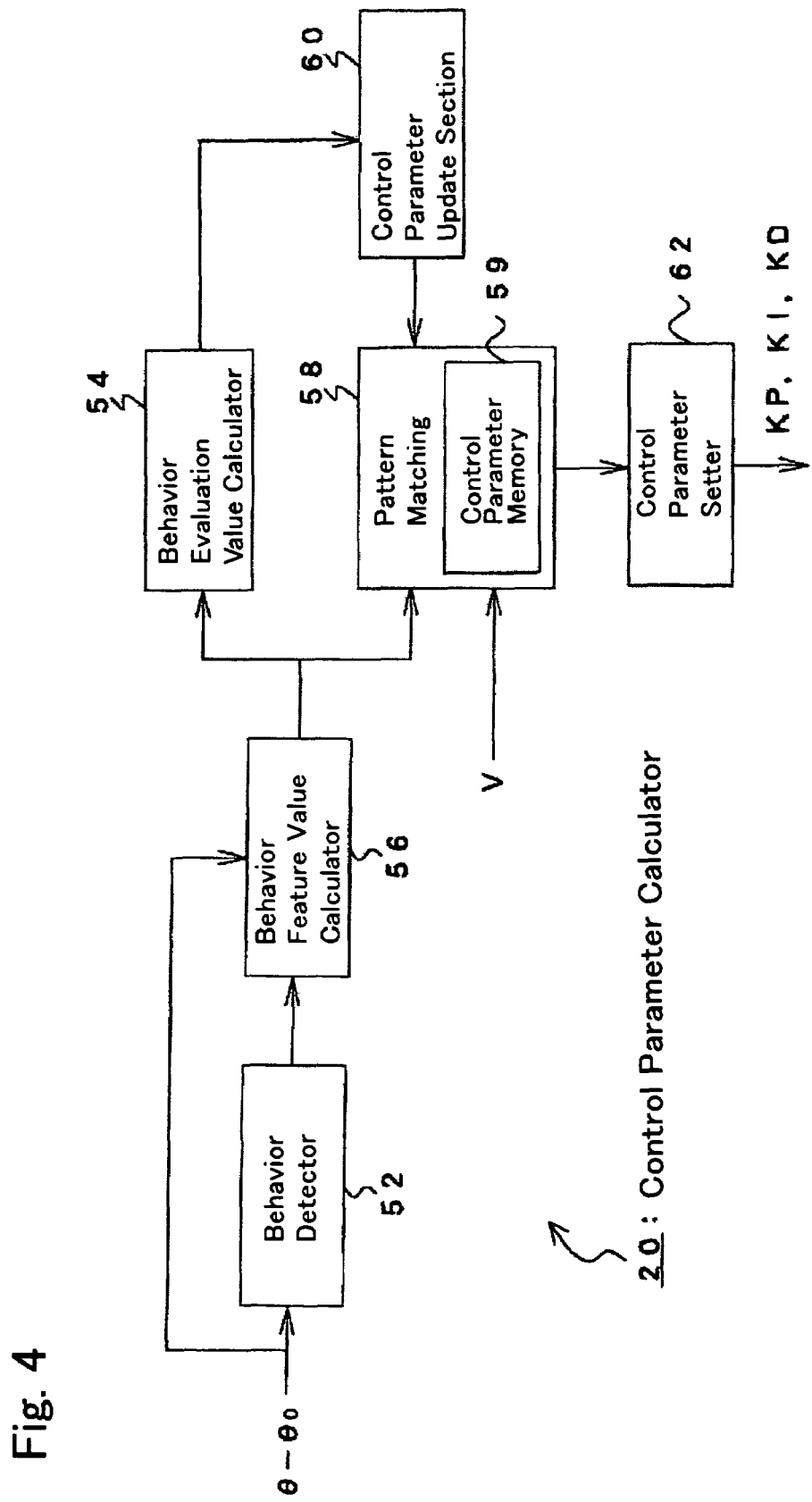
FIG. 4 is a block diagram showing the configuration of a control parameter calculator.

Specifically, the control parameter calculator 20 of this embodiment includes a behavior detector 52, a behavior feature value calculator 56, a behavior evaluation value calculator 54, a pattern matching section 58, a control parameter update section 60 and control parameter setter 62 as shown in FIG. 4. The deviation ($\theta - \theta_0$) output from the adder 18 is input into the behavior detector 52 as illustrated. Based on this input, the behavior detector 52 successively determines times at which the ship exhibits a specific behavior pattern, or yawing, that is, a motion of the ship from a point in time at which the deviation ($\theta - \theta_0$) of the ship takes a maximal value to a point in time at which the deviation ($\theta - \theta_0$) takes another maximal value.

Figure 5:
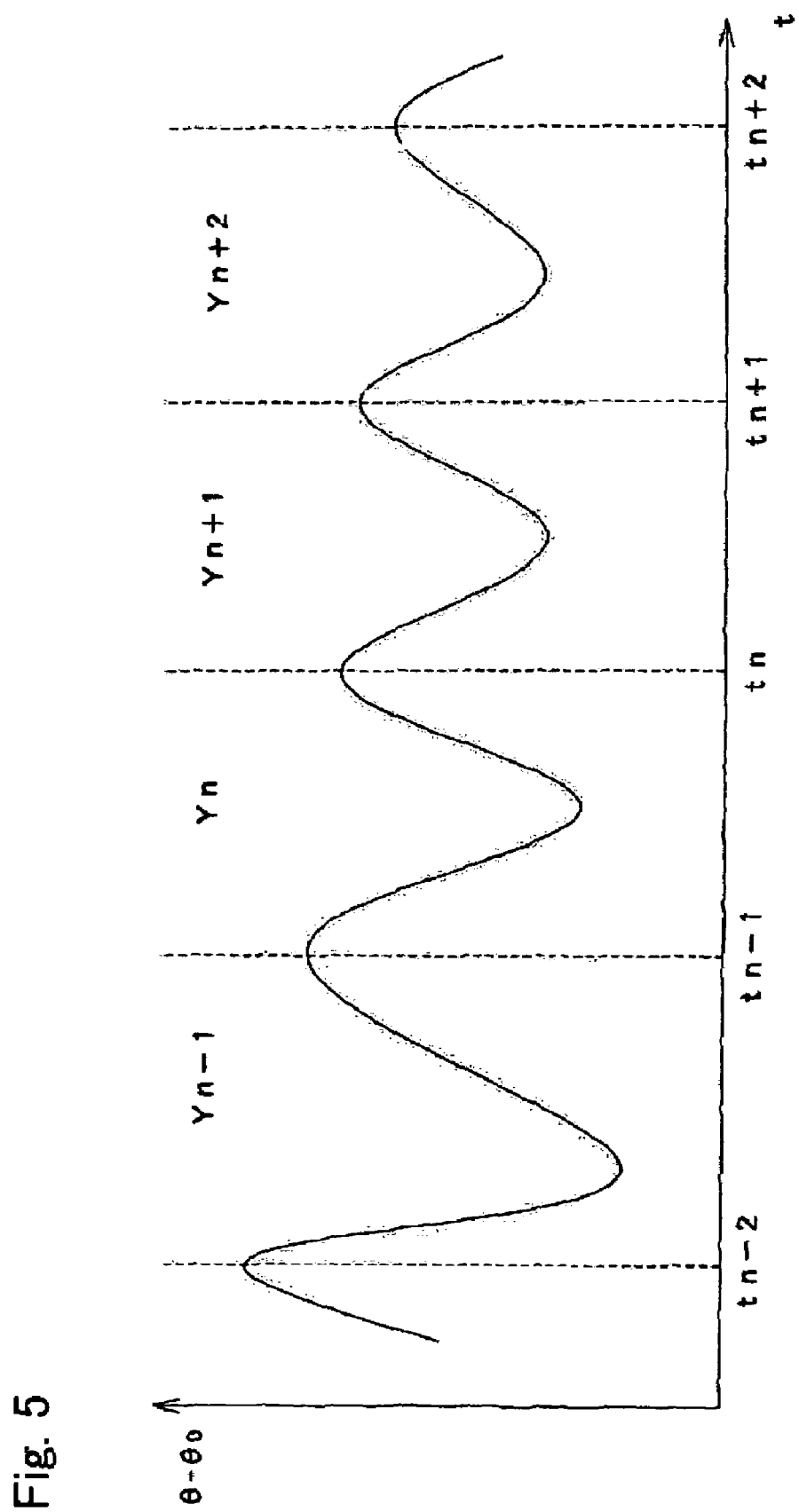
FIG. 5 is a diagram showing how a deviation of a ship's true heading from an intended course varies with time.

As an example, the behavior detector 52 sequentially calculates, based on values of the deviation ($\theta - \theta_0$) that are sequentially input, the difference between a latest deviation ($\theta - \theta_0$) and an immediately preceding deviation ($\theta - \theta_0$), and judges that a point in time at which this difference varies from a positive value to a negative value is a timing at which the ship's heading θ, which is the control quantity, takes a maximal value. At the same time, the behavior detector 52 judges that this point in time is an end timing of a preceding behavior of the ship and is also a start timing of a succeeding behavior of the ship. More particularly, the deviation $(\theta-\theta_0)$ output from the adder 18 repetitively increases and decreases under ordinary situations as shown in FIG. 5. The behavior detector 52 detects every point in time at which the deviation $(\theta-\theta_0)$ takes a maximal value, or at which the ship's heading θ takes a maximal value, in a yawing pattern of the ship shown by a waveform in FIG. 5 and supplies information on such a detected point in time to the behavior feature value calculator 56 as an end timing of a particular behavior of the ship and as a start timing of a succeeding behavior of the ship. In an alternative form of the embodiment, the behavior detector 52 may determine the start timing and the end timing of each behavior of the ship based on a point in time at which the ship's heading θ takes a minimal value or at which the plus and minus signs of a second-order differential are reversed.

The start timing and the end timing of each ship behavior (yawing cycle) are sequentially. supplied from the behavior detector 52 to the behavior feature value calculator 56, while the deviation $(\theta-\theta_0)$ output from the adder 18 is sequentially supplied to the behavior feature value calculator 56. The behavior feature value calculator 56 has a memory which stores the deviation $(\theta-\theta_0)$ in at least one behavior of the ship. The behavior feature value calculator 56 calculates values of behavior features based on the deviation $(\theta-\theta_0)$ supplied from the adder 18 during a time duration of each successive ship behavior. As an alternative, the behavior feature value calculator 56 may calculate the values of behavior features without the provision of the memory.

Figure 6:
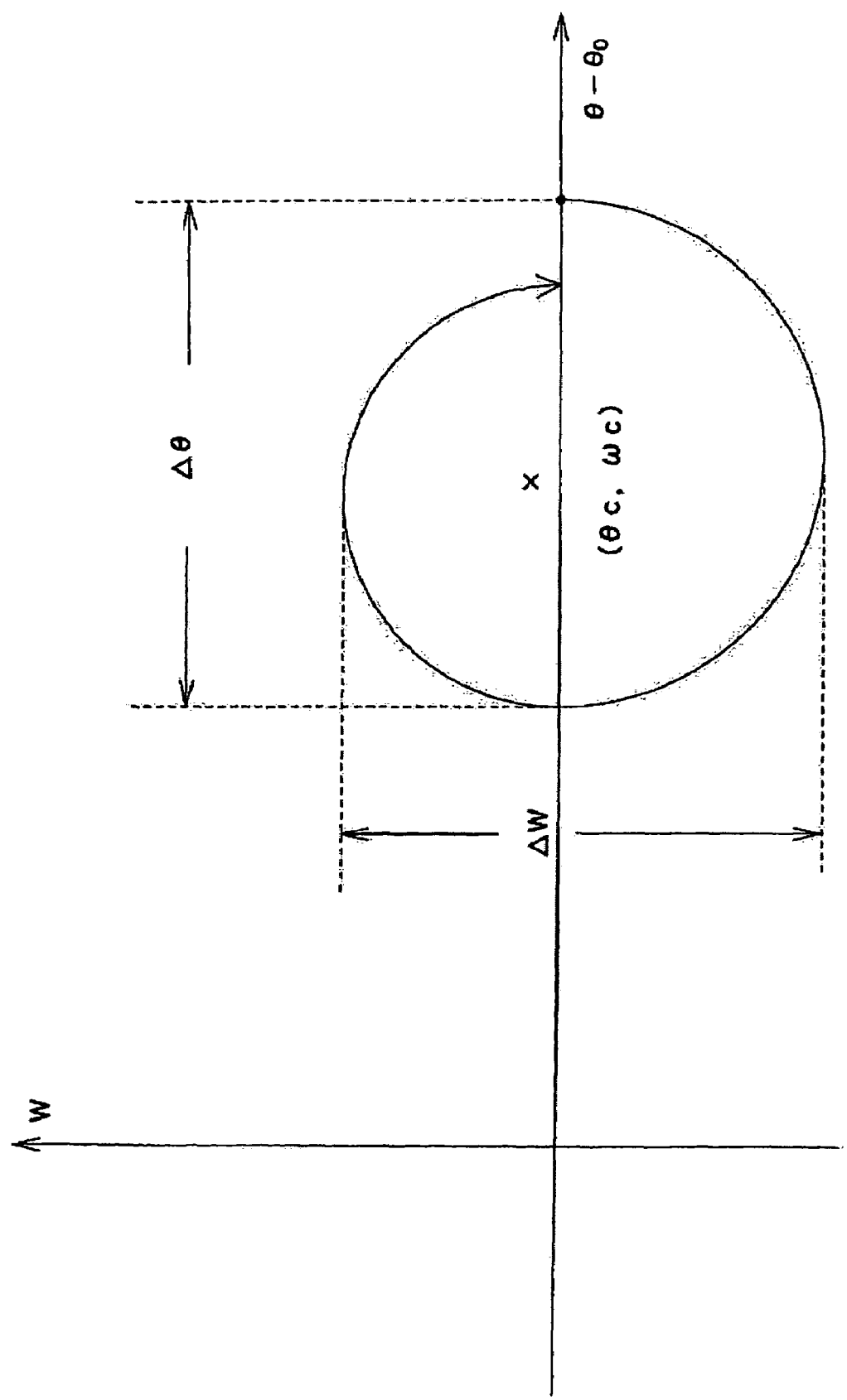
FIG. 6 is a diagram showing how the deviation and a first-order differential thereof varies during one ship behavior.

In this embodiment, the behavior feature value calculator 56 calculates an average θc of values of the deviation $(\theta-\theta_0)$ acquired during one behavior cycle, an average ωc of values of first-order differential ω of the deviation $(\theta-\theta_0)$ acquired during one behavior cycle, a difference Δθ between maximum and minimum values of the deviation $(\theta-\theta_0)$ acquired during one behavior cycle, and a difference Δω between maximum and minimum values of the first-order differential values ω of the deviation $(\theta-\theta_0)$ acquired during one behavior cycle as the values of features of each successive ship behavior. FIG. 6 is a diagram showing the deviation $(\theta-\theta_0)$ observed during a particular ship behavior in a phase plane of which horizontal axis represents the deviation $(\theta-\theta_0)$ and vertical axis represents the first-order differential ω of the deviation $(\theta-\theta_0)$. The behavior feature value calculator 56 calculates the values of θc, ωc, Δθ and Δω shown in FIG. 6 as the feature values of each successive ship behavior.

The individual feature values calculated by the behavior feature value calculator 56 are supplied to the behavior evaluation value calculator 54 and the pattern matching section 58. More specifically, the averages θc and ωc are supplied to the pattern matching section 58 while the averages θc and ωc, the Δθ between the maximum and minimum values of the deviation $(\theta-\theta_0)$ and the difference Δω between the maximum and minimum values of the first-order differential values ω of the deviation $(\theta-\theta_0)$ are supplied to the behavior evaluation value calculator 54. Additionally, the current ship speed V output from the unillustrated satellite positioning system or ship speed sensor is fed into the pattern matching section 58. While the aforementioned parameters (θc, ωc, Δθ, Δω) are used as the ship behavior feature values in the present embodiment, it is needless to say that other quantities may be used as the ship behavior feature values.

The pattern matching section 58 sequentially judges which one of multiple behavior patterns a behavior pattern exhibited by the ship during the time duration of each behavior matches based on the heading θ detected by the heading sensor 14 during each successive behavior cycle by the behavior detector 52. While the pattern matching section 58 performs this pattern matching process by later-described fuzzy inference using a membership function group and a fuzzy rule table group in the present embodiment, the pattern matching process may be performed by means of a neural network, a radial basis function (RBF) network or a wavelet network instead. Alternatively, the ship's behavior pattern may be judged in a simpler way, such as by predefining ranges of behavior feature values of the ship corresponding to individual behavior patterns and determining the ship's behavior pattern depending on to which range each of the behavior feature values calculated on an actual behavior of the ship belongs.

The pattern matching section 58 includes a control parameter memory 59 for storing sets of control parameters (proportional coefficient KP, integral coefficient KI and differential coefficient KD) correlated with multiple behavior patterns. More particularly, the control parameter memory 59 stores multiple sets of control parameters (conclusion portion singleton) together with information on a correlation with individual behavior patterns (premise portion), in which the individual control parameter sets are correlated with specific values of the ship speed V. In other words, the control parameter memory 59 stores multiple control parameter sets in correlation with combinations of the behavior patterns and the values of the ship speed V. The control parameter memory 59 may include such storage medium of the prior art as a random-access memory (RAM), read-only memory (ROM) or a hard disk drive, for example. The pattern matching section 58 sequentially reads out control parameter sets from those stored in the control parameter memory 59 in correlation with behavior patterns matching successive behaviors of the ship sequentially judged in the aforementioned manner and outputs the control parameter sets to the control parameter setter 62. Should there exist multiple behavior patterns matching the behavior of the ship, centers of gravity of the control parameters corresponding to those behavior patterns may be supplied to the control parameter setter 62.

Figure 7A:
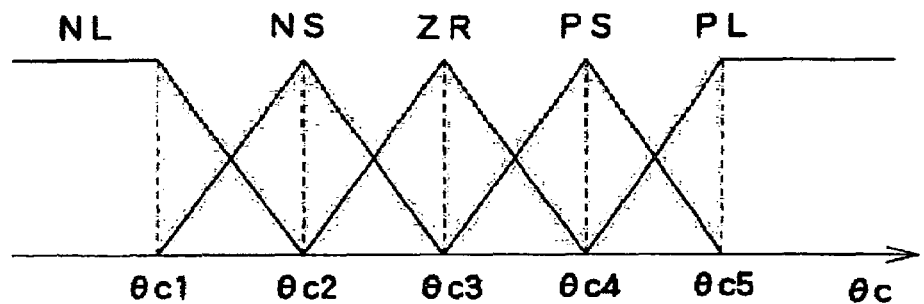
FIGS. 7A, 7B and 7C are diagrams showing an example of a membership function group.
Figure 7B:
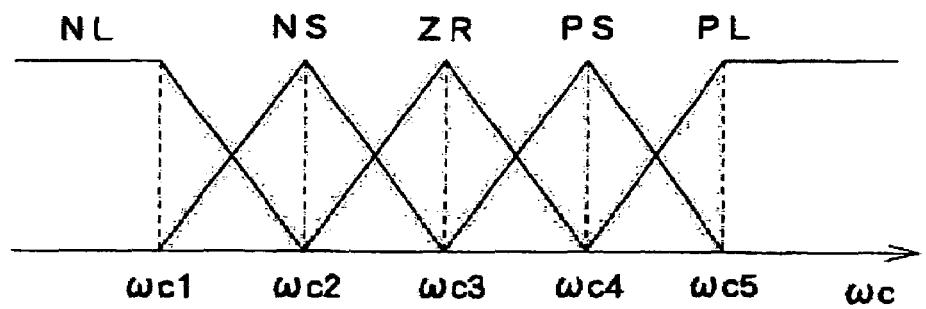
Figure 7C:
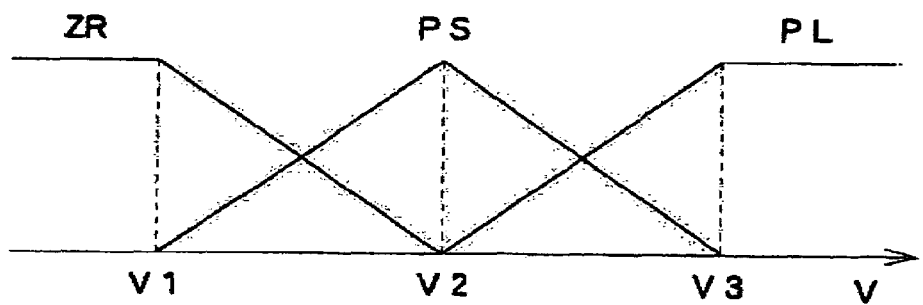

The pattern matching process performed by the pattern matching section 58 is now explained, by way of example, with reference to a case where a fuzzy inference approach is used in the process. FIGS. 7A, 7B and 7C are diagrams showing an example of a membership function group stored in the pattern matching section 58. The feature values θc and ωc fed into the pattern matching section 58 are evaluated through a comparison with membership functions shown in FIGS. 7A and 7B and indexes of goodness of fit of the feature values θc, ωc with individual fuzzy sets are calculated. The ship speed V input into the pattern matching section 58 is also evaluated through a comparison with a membership function shown in FIG. 7C and indexes of goodness of fit of the ship speed V with individual fuzzy sets are calculated. Then, based on the goodness of fit indexes thus calculated, a single or multiple fuzzy if-then rules are selected.

FIG. 8 is a diagram showing an example of a fuzzy rule table group stored in the control parameter memory 59. As shown in FIG. 8, the control parameter memory 59 stores a plurality of 3-input, 1-output fuzzy rule tables of which "if" or premise portions being the feature values θc, ωc and the ship speed V and "then" or conclusion portion being the aforementioned control parameter set Pmn (singleton). The 3-input, 1-output fuzzy rule tables are stored for the individual control parameters (KI, KP, KD). The ship is manually steered when the value of the ship speed V is negative. It is made possible to obtain a control parameter set Pmn corresponding to the feature values θc, ωc and the ship speed V from the aforementioned table group. The control parameter setter 62 sets the individual values (KI, KP, KD) of the control parameter set Pmn thus acquired in the coefficient amplifiers 32, 34, 38 of the steering amount calculator 22, respectively. As will be later discussed, amounts obtained by adding specific values to the individual control parameters are supplied to the steering amount calculator 22 when an adaptive control approach is used.

As previously mentioned, the behavior evaluation value calculator 54 acquires the feature values of individual behaviors of the ship from the behavior feature value calculator 56. The behavior evaluation value calculator 54 calculates an evaluation value f of each behavior based on the acquired feature values. The evaluation value f is calculated by equation (1) below and supplied to the control parameter update section 60.

$$f = \theta c^2 + \omega c^2 + \Delta \theta^2 + \Delta \omega^2 \qquad (1)$$

The feature values θc, ωc indicate an overall deviation of each behavior from a home position so that the smaller these values θc, ωc the more desirable is judged the behavior. Also, the feature values θc, ωc represent the magnitude of each behavior so that the smaller these values θc, ωc the more desirable is judged the behavior. In the automatic steering control system 10 of this embodiment, the control parameters stored in the control parameter memory 59 are updated in a manner that minimizes the evaluation value f which is an increasing function.

More particularly, the control parameter setter 62 updates the content of the control parameter memory 59 by increasing those control parameters (proportional coefficient KP, integral coefficient KI and differential coefficient KD) which correspond to a behavior pattern of the highest goodness of fit with respect to the ship's actual behavior among the control parameters read out from the control parameter memory 59 by update amounts ΔKP, ΔKI and ΔKD. Then, the pattern matching section 58 reads out control parameter sets corresponding to the ship's behavior pattern again, and the centers of gravity of the control parameters are supplied to the control parameter setter 62. The control parameter setter 62 supplies these control parameters to the steering amount calculator 22. While the update amounts ΔKP, ΔKI and ΔKD may be fixed values, the update amounts should preferably be calculated based on the heading θ or behavior feature values determined from the heading θ, for instance. As an example, the update amounts ΔKP, ΔKI and ΔKD may be values proportional to the difference between evaluation values fn+1 and fn of successive ship behaviors. In this case, the update amounts ΔKP, ΔKI and ΔKD may take negative values. When the update amounts ΔKP, ΔKI and ΔKD can take negative values, increasing the values of the coefficients KP, KI, KD means that the update amounts ΔKP, ΔKI, ΔKD are added to the coefficients KP, KI, KD and decreasing the values of the coefficients KP, KI, KD means that the update amounts ΔKP, ΔKI, ΔKD are subtracted from the coefficients KP, KI, KD, respectively, in the foregoing.

A control operation is performed by the steering amount calculator 22 based on the control parameters fed from the control parameter calculator 20 in the aforementioned manner. If the result of evaluation of a succeeding behavior of the ship is improved (i.e., if the evaluation value f decreases) as a result of this control operation, it is judged that increases in the coefficients KP, KI, KD by the update amounts ΔKP, ΔKI, ΔKD have contributed to an improvement in the control operation. In this case, the control parameter update section 60 further increases the individual control parameters which correspond to a behavior pattern of the highest goodness of fit with respect to the ship's preceding behavior by as much as ΔKP, ΔKI and ΔKD. If the result of evaluation of a succeeding behavior of the ship deteriorates (i.e., if the evaluation value f increases) as a result of the control operation on the contrary, it is judged that increases in the coefficients KP, KI, KD by the update amounts ΔKP, ΔKI, ΔKD have lead to a deterioration in the control operation. In this case, the control parameter update section 60 decreases the individual control parameters by as much as 2ΔKP, 2ΔKI and 2ΔKD.

The control parameter setter 62 sequentially updates the individual control parameters stored in the control parameter memory 59 in a manner that minimizes the aforementioned evaluation value f. This approach makes it possible to properly control the behavior of various types of ships without the need to precisely preset their control parameters. While the foregoing explanation has illustrated a method in which only those control parameters which correspond to a behavior pattern of the highest goodness of fit with respect to the ship's actual behavior, or control parameters corresponding to a so-called winner pattern, are updated, the present invention is not limited to this method.

Operation of the automatic steering control system 10 of the present embodiment will be hereinafter explained.

Figure 9:
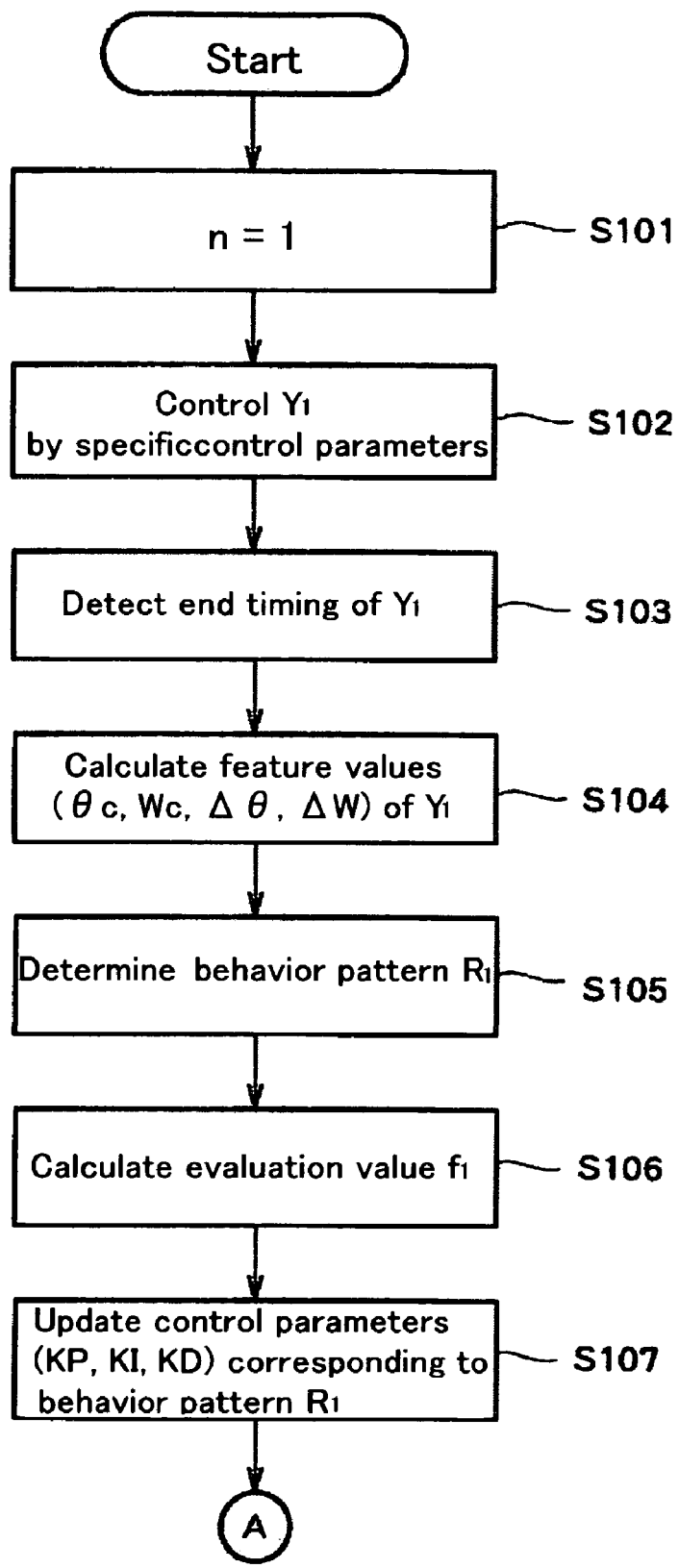
FIG. 9 is a flowchart showing a first part of the operation of the automatic steering control system according to the embodiment of the invention.
Figure 10:
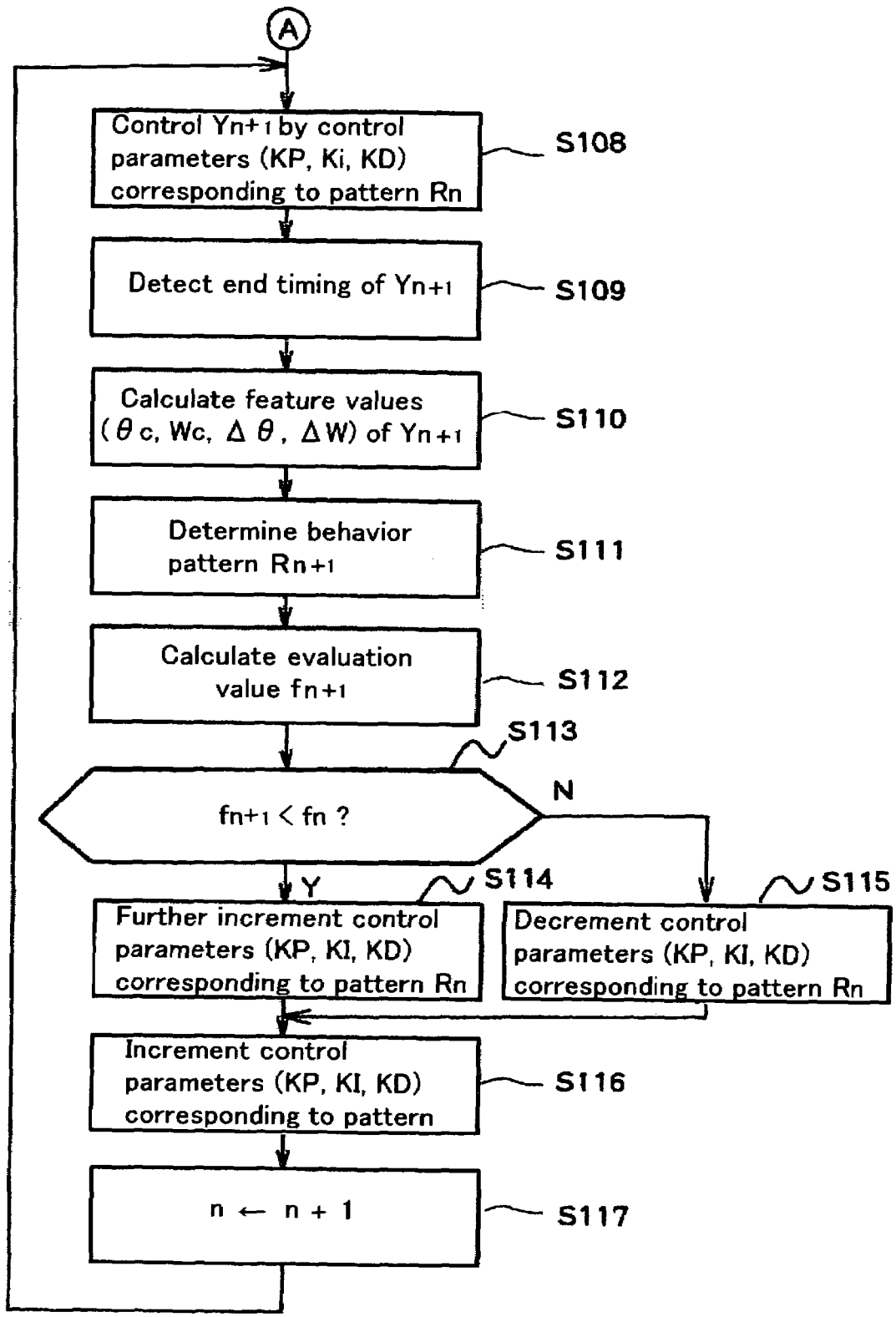
FIG. 10 is a flowchart showing a second part of the operation of the automatic steering control system according to the embodiment of the invention.

FIGS. 9 and 10 are flowcharts showing the operation of the automatic steering control system 10 of the foregoing embodiment. Referring to FIG. 9, the automatic steering control system 10 appropriates a memory space for storing a variable n for identifying each successive ship behavior at first and sets this variable n to an initial value "1" (step S101). Then, predefined initial values of the control parameters (proportional coefficient $KP_0$, integral coefficient $KI_0$ and differential coefficient $KD_0$) are supplied to the steering amount calculator 22 and the steering unit 16 is controlled by these coefficients $KP_0$, $KI_0$, $KD_0$ during a current cycle of behavior (yawing) Y1 (step S102). The behavior detector 52 monitors the ship behavior to detect an end timing of the behavior Y1 by examining the deviation (θ−$θ_0$) (step S103). Upon detecting the end timing of the behavior cycle Y1, the behavior detector 52 supplies information on the end timing of the behavior Y1 to the behavior feature value calculator 56, whereby the behavior feature value calculator 56 calculates feature values (θc, ωc, Δθ, Δω) of the behavior Y1 (step S104).

The feature values thus calculated are supplied to both the pattern matching section 58 and the behavior evaluation value calculator 54 and the pattern matching section 58 determines a behavior pattern R1 which the behavior Y1 best matches (step S105). On the other hand, the behavior evaluation value calculator 54 calculates an evaluation value f1 of the behavior Y1 (step S106). The pattern matching section 58 reads out control parameters corresponding to the behavior pattern R1 determined in step S105 and the control parameter setter 62 increments the control parameters (KP, KI, KD) by as much as the aforementioned update amounts ΔKP, ΔKI and ΔKD. Then, the updated control parameters are stored in the control parameter memory 59 in correlation with the behavior pattern R1. The control parameters corresponding to the behavior pattern R1 are updated in this fashion. Subsequently, the pattern matching section 58 acquires control parameters through another fuzzy inference operation based on the updated control parameters and supplies these control parameters to the steering amount calculator 22 (step S107).

Referring to FIG. 10, the steering amount calculator 22 controls the steering unit 16 using the control parameters fed from the control parameter setter 62 in step S107 during a succeeding cycle of behavior Y2 (step S108). Then, the behavior detector 52 monitors the ship behavior to detect an end timing of the behavior Y2 by examining the deviation ($\theta-\theta_0$) (step S109). Upon detecting the end timing of the behavior cycle Y2, the behavior detector 52 supplies information on the end timing of the behavior Y2 to the behavior feature value calculator 56, whereby the behavior feature value calculator 56 calculates feature values ($\theta c, \omega c, \Delta\theta, \Delta\omega$) of the behavior Y2 (step S110). The feature values thus calculated are supplied to both the pattern matching section 58 and the behavior evaluation value calculator 54, and the pattern matching section 58 determines a behavior pattern R2 which the behavior Y2 best matches (step S111). On the other hand, the behavior evaluation value calculator 54 calculates an evaluation value f2 of the behavior Y2 (step S112).

Then, the control parameter update section 60 judges whether the evaluation value f2 of the behavior Y2 is smaller than the evaluation value f1 of the behavior Y1 (step S113). If f2<f1, the control parameter setter 62 judges that the control operation for the behavior Y1 has been successful and updates the content of the control parameter memory 59 by further increasing the control parameters corresponding to the behavior pattern R1 by as much as the aforementioned update amounts $\Delta KP, \Delta KI$ and $\Delta KD$ (step S114). If f2≧f1 in step S113, on the contrary, the control parameter setter 62 updates the content of the control parameter memory 59 by decreasing the control parameters corresponding to the behavior pattern R1 by $2\Delta KP, 2\Delta KI$ and $2\Delta KD$ (step S115).

Subsequently, the pattern matching section 58 reads out control parameters corresponding to the behavior pattern R2 determined in step Sill and the control parameter setter 62 increments the control parameters (KP, KI, KD) by as much as the aforementioned update amounts $\Delta KP, \Delta KI$ and $\Delta KD$. Then, the control parameter setter 62 stores the updated control parameters in the control parameter memory 59 in correlation with the behavior pattern R2. The control parameters corresponding to the behavior pattern R2 are updated in this fashion. The pattern matching section 58 acquires control parameters through another fuzzy inference operation based on the updated control parameters and supplies these control parameters to the steering amount calculator 22 (step S116). Then, the variable n is incremented by 1 (step S117) and the operation flow returns to step S108. Subsequently, steps S108 to S117 are repetitively executed to control the steering unit 16 through a succeeding sequence of behaviors Yn.

The aforementioned automatic steering control system 10 makes it possible to properly control the ship using the control parameters corresponding to a pattern of repetitive increase and decrease in the deviation ($\theta-\theta_0$) of the ship's heading $\theta$ (control quantity) from the intended course $\theta_0$ (target value). As the automatic steering control system 10 employs the adaptive control approach in which successive ship behaviors are evaluated and the control parameters are updated according to the result of evaluation, it is possible to control various types of ships without the need to perform a complicated process of adjusting various parameters.

While the invention has so far been described with reference to the preferred embodiment thereof, the invention is not limited thereto. Specifically, although the foregoing explanation deals with a case in which the present invention is applied to adaptive control operation of the ship, the invention is applicable to other kinds of mobile units. The invention is also applicable to other than controlling the mobile units. Furthermore, the invention is applicable to controlling not only the moving direction of a mobile unit but also the attitude or moving speed of the mobile unit. Moreover, the invention is applicable to controlling not only the motion of the mobile unit but also to. controlling a physical quantity, such as temperature or density. In addition, although the control parameters (KP, KI, KD) are simultaneously updated in the aforementioned embodiment, the control parameters may be updated one after another at intervals of a specific number of behaviors, so that the influence of varying each control parameter can be fed back to perform more proper control operation through such learning process.

What is claimed is:

1. A control system for controlling a heading of a ship to be controlled, said control system comprising:
    a heading of the ship acquisition section for sequentially acquiring instantaneous values of the heading of the ship;
    a timing judgment section for sequentially determining a time duration of each of specific kinds of behaviors of the ship based on the values of the heading of the ship acquired by the heading of the ship acquisition section;
    a behavior pattern judgment section for sequentially determining a behavior pattern which each of the behaviors of the controlled ship matches from among multiple behavior patterns based on the values of the heading of the ship acquired by the heading of the ship acquisition section during the time duration of each of the behaviors sequentially determined by the timing judgment section;
    a control parameter storage section for storing control parameters in correlation with each of the multiple behavior patterns;
    a control parameter read-out section for sequentially reading out the control parameters stored in the control parameter storage section in correlation with the behavior pattern which each of the behaviors of the controlled ship matches as determined by the behavior pattern judgment section; and
    a control section for controlling a steering device of the controlled ship based on the control parameters sequentially read out by the control parameter read-out section.

2. The control system according to the claim 1 further comprising:
    a behavior evaluation value calculating section for sequentially calculating an evaluation value of the behavior performed by the controlled subject based on the values of the control quantity acquired by the control quantity acquisition section during the time duration of each of the behaviors sequentially determined by the timing judgment section; and
    a control parameter update section for updating the control parameters stored in the control parameter storage section based on the evaluation value sequentially calculated by the behavior evaluation value calculating section.

3. The control system according to the claim 2, wherein the control parameter update section updates the control parameters used during the time duration of each behavior corresponding to the evaluation value sequentially calculated by the behavior evaluation value calculating section.

4. The control system according to one of the claims 1 through 3, wherein the timing judgment section determines timings at which the control quantity acquired by the control quantity acquisition section take extrema as being a start timing and an end timing of the time duration of each of the behaviors based on the values of the control quantity acquired by the control quantity acquisition section.

* * * * *